United States Patent [19]

Fukuda

[11] Patent Number: 5,608,594
[45] Date of Patent: Mar. 4, 1997

[54] SEMICONDUCTOR INTEGRATED CIRCUIT WITH SURGE-PROTECTED OUTPUT MISFET'S

[75] Inventor: Yasuhiro Fukuda, Tokyo, Japan

[73] Assignee: Oki Electric Industry Co., Ltd., Tokyo, Japan

[21] Appl. No.: 505,078

[22] Filed: Aug. 14, 1995

Related U.S. Application Data

[63] Continuation-in-part of Ser. No. 42,402, Apr. 3, 1993.

[30] Foreign Application Priority Data

Apr. 14, 1992 [JP] Japan .................................. 4-093970

[51] Int. Cl.$^6$ ..................................................... H02H 9/04
[52] U.S. Cl. .............................. 361/58; 361/18; 361/111; 361/56
[58] Field of Search .............................. 361/56, 58, 111, 361/91, 18; 257/355–360

[56] References Cited

U.S. PATENT DOCUMENTS 4,066,918  1/1978  Heuner et al. .......................... 307/304
4,855,863  8/1989  Yoshitake .................................. 361/91

FOREIGN PATENT DOCUMENTS 2-90669  5/1990  Japan .

Primary Examiner—Jeffrey A. Gaffin
Assistant Examiner—Michael J. Sherry
Attorney, Agent, or Firm—Law Office of Steven M. Rabin

[57] ABSTRACT

A semiconductor integrated circuit includes an internal circuit, and ground and power supply lines for activating the internal circuit. An output MISFET is activated by peripheral circuit ground and power supply lines. For protection of the internal circuit from the effects of ground or power supply line noise, an impedance electrically separates the power supply lines for the internal and peripheral circuits and/or the ground lines for the peripheral and internal circuits. A surge protection circuit is provided between the gate of the output MISFET, and either or both of the ground and power supply lines for the peripheral circuitry. In response to a breakdown of the output MISFET due to a surge of static electricity, the surge protection circuit reduces the voltage difference between the gate of the output MISFET and either or both of the ground and power supply lines for peripheral circuitry, thus reducing the voltage applied across the gate insulation film of the output MISFET and keeping the gate insulation film from being damaged.

30 Claims, 6 Drawing Sheets

SEMICONDUCTOR INTEGRATED CIRCUIT WITH SURGE-PROTECTED OUTPUT MISFET'S

CROSS REFERENCE TO RELATED APPLICATIONS

This application claims priority benefits, under 35 USC 119, of Japanese patent application no. 04-093970, filed Apr. 14th, 1992, the disclosure of which is incorporated herein by reference. Furthermore, this application is a continuation-in-part of U.S. application Ser. No. 08/042,402, filed Apr. 3, 1993, the disclosure of which is also incorporated herein by reference.

BACKGROUND OF THE INVENTION

1. Field of the Invention

This invention relates to a semiconductor integrated circuit including MISFET's (Metal Insulator Semiconductor Field Effect Transistors) and, more particularly, to a semiconductor integrated circuit having output MISFET transistors which are subject to damage by static electricity.

2. Description of the Related Art

With the increasing speed of semiconductor integrated circuits constructed with MISFET's, fluctuations of ground or power supply line voltage during signal output at an external output terminal or an external input/output terminal (hereinafter, simply referred to as an external output terminal), increases the amount of noise in the signal.

A semiconductor integrated circuit generally has its power supply and ground lines for peripheral circuitry, and those for internal circuitry, divided by the pattern of its lines so that noise occurring at the lines for peripheral circuitry never affects the internal circuitry connected to their own separate power supply and ground lines.

A prior semiconductor integrated circuit constructed with MISFET's includes an input circuit which is connected to its own power supply and ground lines. The output side of the input circuit is connected to an internal circuit on an output side. The internal circuit is in turn connected to an output circuit having inverters, the inverters being connected to an external output terminal. The internal and output circuitry are connected to a second set of power supply and ground lines which are separated from, or electrically connected via respective impedances with, the power supply and ground lines for the input circuit. Therefore, the power supply and ground lines for the output and internal circuitry will not transmit, to the input circuit, power supply voltage fluctuations caused by the internal circuit. Consequently, such fluctuations will not reduce the voltage margin of the input circuit for detecting the input signal. Moreover, to further protect the circuit from malfunctions due to noise in the ground and power supply lines, the output transistors are typically connected to their power supply line and/or ground line through a high impedance.

Conventionally, the external output terminal of a semiconductor integrated circuit has a lower input impedance than the external input terminal. Therefore in the past, such semiconductor integrated circuits have had stronger resistance to damage from static electricity appearing on their external output terminal, than from static electricity appearing on the external input terminal. For conventional semiconductor integrated circuits constructed with MISFET's, the gate insulation film of the MISFET's forming the input circuit is subject to damage from a static charge on the external input or output terminal. Therefore protection circuits are generally provided for protecting the transistors of the input circuit. For example, an input protection circuit has been provided between the external input terminal and the input power supply and ground lines, respectively. Another protection circuit has been provided between the external input and output terminals.

In such a circuit, when a surge is induced by a static electrical charge on the external input terminal, the charge producing a higher voltage than the reverse breakdown voltage of the input MISFET's, the input protection circuit provides a path for escape of the static charge to either the input circuit's power supply line or ground line. Thus, the input protection circuit prevents the gate insulation film of input MISFET's from being damaged.

Also, if a static charge on the external input terminal reaches several kilovolts, while the voltage level of the external output terminal is at ground, the protection circuit between the two terminals carries the surge current to the external output terminal, thereby preventing the gate insulation film of the input MISFET from being damaged. Similarly, if a high voltage surge of static electricity is applied to the external output terminal while the voltage on the external input terminal is at ground level, the same protection circuit protects the input MISFET by conducting the charge to the external input terminal. However, these protection circuits will not protect the gate insulation film of an output MISFET of the output circuit, from the effects of a surge of static electricity therethrough between the external output terminal and the ground and power supply lines, as will be described below.

With the shrinkage of such semiconductor integrated circuits, MISFET's are now being formed with a LDD (Lightly Doped Drain) structure in order to avoid lowering of reliability caused by injection of hot carriers. However, output circuit MISFET's having LDD structures are more prone than their predecessors to damage from static electricity on the external output terminal. That is, when the power supply and/or ground lines are divided for the internal and peripheral circuitry, by having a high impedance in the lines connecting the output circuit MISFET's to the power supply and/or ground terminal, the MISFET cannot withstand the high drain to gate voltage which the high impedance maintains although the MISFET is conducting. This can present a problem for the shrinkage of semiconductor circuits which use MISFET's.

SUMMARY OF THE INVENTION

It is an object of the invention to provide a semiconductor integrated circuit, including especially divided ground and power supply lines for internal and peripheral circuits, and having an improved capability to protect a gate insulation film of an output transistor against damage caused by a current surge from static electricity on the external output terminal.

The foregoing object is accomplished with a semiconductor integrated circuit in which a protection circuit is provided between the gate of an output transistor and the ground and power supply lines for peripheral circuitry, which lines are separated by impedance from ground and power supply lines for the internal circuitry. The protection circuit acts to reduce the voltage between the gate of the output transistor and the ground and power supply lines for the peripheral circuit when the output transistor experiences a breakdown due to a surge of static electricity. The protection circuit thereby protects the gate insulation film of the output transistor from being damaged.

Thus, a semiconductor integrated circuit according to the invention includes an internal circuit for providing an internal signal, and first power supply and ground lines for activating the internal circuit. An output MISFET circuit, responsive to the internal signal for outputting an output signal to an external output terminal, is activated by second power supply and ground lines. An impedance circuit electrically connects at least the second power supply line to the first power supply line or the second ground line to the first ground line. A surge protection means is provided between a gate circuit of the output MISFET circuit, and at least the second ground line or the second power supply line. The surge protection circuit is responsive to a breakdown of the MISFET circuit, to reduce the voltage difference between the gate circuit and either or both of the second power supply line and the second ground line. Thereby, the surge protection circuit protects the output MISFET circuit from damage by a surge of static electricity on the external output terminal.

BRIEF DESCRIPTION OF THE DRAWINGS

The above and other objects and features of the invention will be apparent to those skilled in the art from the following detailed description of preferred embodiments of the invention, when considered with the accompanied drawings, in which:

FIG. 5 is a circuit diagram of an arrangement for testing the effect of static electricity on the output terminal of the circuit shown in FIG. 4a.

DETAILED DESCRIPTION OF THE PREFERRED EMBODIMENTS

Figure 1:
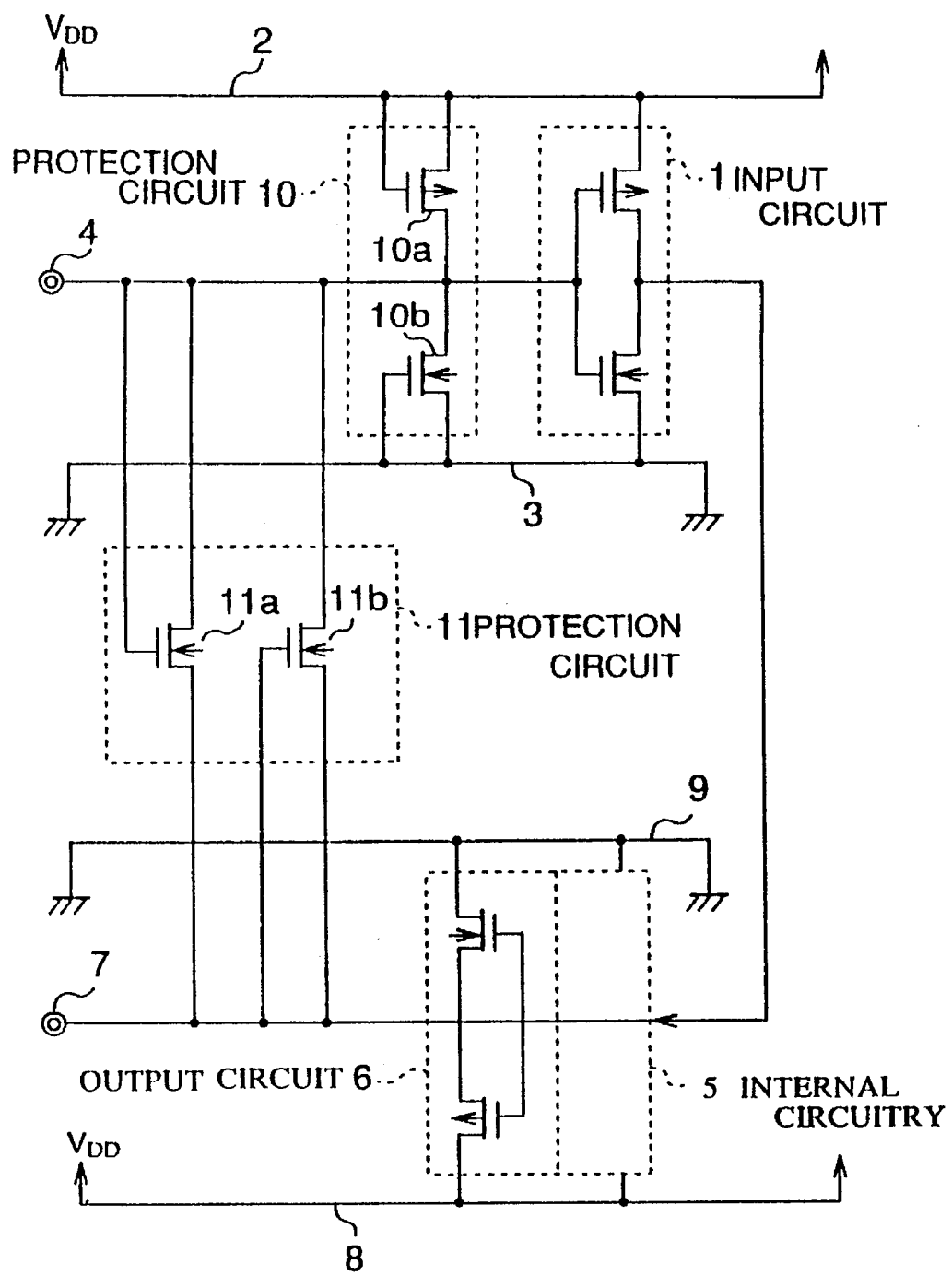
FIG. 1 is a schematic circuit diagram of a conventional semiconductor integrated circuit.

A conventional semiconductor integrated circuit using MISFET's, of a type described in Japanese Unexamined Patent Publication No. 2-090669, is shown in FIG. 1. The semiconductor integrated circuit has power supply and ground lines for an input circuit, and separate power supply and ground lines for internal and output circuits.

The semiconductor integrated circuit includes an input circuit 1. The input circuit 1 is connected to a power supply voltage VDD by a first power supply line 2, and to a first ground line 3. The input side of the circuit 1 is connected to an external input terminal 4. The output side of the circuit 1 is connected to internal circuitry 5. An output side of the internal circuitry 5 is connected to an output circuit 6. Inverters on the output side of the output circuit 6 are connected to an external output terminal 7. The internal circuitry 5 and output circuit 6 are connected to a second power supply line 8 and a second ground line 9. Lines 8 and 9 are separated from, or electrically connected, via respective impedance elements, with the first power supply line 2 and the first ground line 3.

The internal circuitry 5 may cause fluctuations in the voltage on the second power supply and ground lines 8, 9. However, since the lines 2, 3 are separated from the second power supply and ground lines 8, 9, the lines 2, 3 do not transmit the voltage fluctuations to the input circuit 1.

Protection circuits 10 and 11 are provided for protecting the MISFET transistors of the input circuit 1. An input protection circuit 10 includes a p-channel type MISFET 10a connected between the external input terminal 4 and the first power supply line 2. The protection circuit 10 also includes an n-channel type MISFET 10b connected between the external input terminal 4 and the first ground line 3. The protection circuit 11 includes an n-channel type MISFET 11a whose drain and gate are connected to the external input terminal 4 and whose source is connected to the external output terminal 7. The protection circuit 11 also includes an n-channel type MISFET 11b whose drain is connected to the external input terminal 4 and whose source and gate are connected to the external output terminal 7.

When a surge of static electricity is induced by a voltage, on the terminal 4, higher than a reverse breakdown voltage of the MISFET's of the input circuit 1, the MISFET's 10a, 10b in the input protection circuit 10 carry the static electricity to either the first power supply line 2 or the first ground line 3. This prevents a breakdown of the gate insulation film of the MISFET's forming the input circuit 1. When a surge by static electricity is created as a result of a voltage of several kilovolts on the external input terminal 4 while the voltage level of the external output terminal 7 is at ground, the MISFET 11a conducts the charge to the external output terminal 7, likewise preventing a breakdown of the gate insulation film of the MISFET's forming the input circuit 1.

Similarly, when a high voltage surge by static electricity is applied to the external output terminal 7 while the voltage on the external input terminal 4 is at ground level, the MISFET 11b conducts the charge to the external input terminal 4. Thus, the protection circuit 11 is able to absorb surges caused by static electricity applied between the external input and output terminals 4, 7, thereby to prevent damage from a breakdown of the gate insulation film of the MISFET's forming the input circuit 1.

However, the protection circuit 11 cannot protect the gate insulation film of the output MISFET's of the output circuit 6 from being damaged by a surge of static electricity between the external output terminal and the ground or power supply lines. This may be understood by referring to FIG. 2, which shows in greater detail an essential part of the conventional semiconductor integrated circuit of FIG. 1, elements in common with those in FIG. 1 being identified by the same reference numbers. The circuit is shown connected to an arrangement for simulating and testing the effect of static electricity on the circuit.

Figure 2:
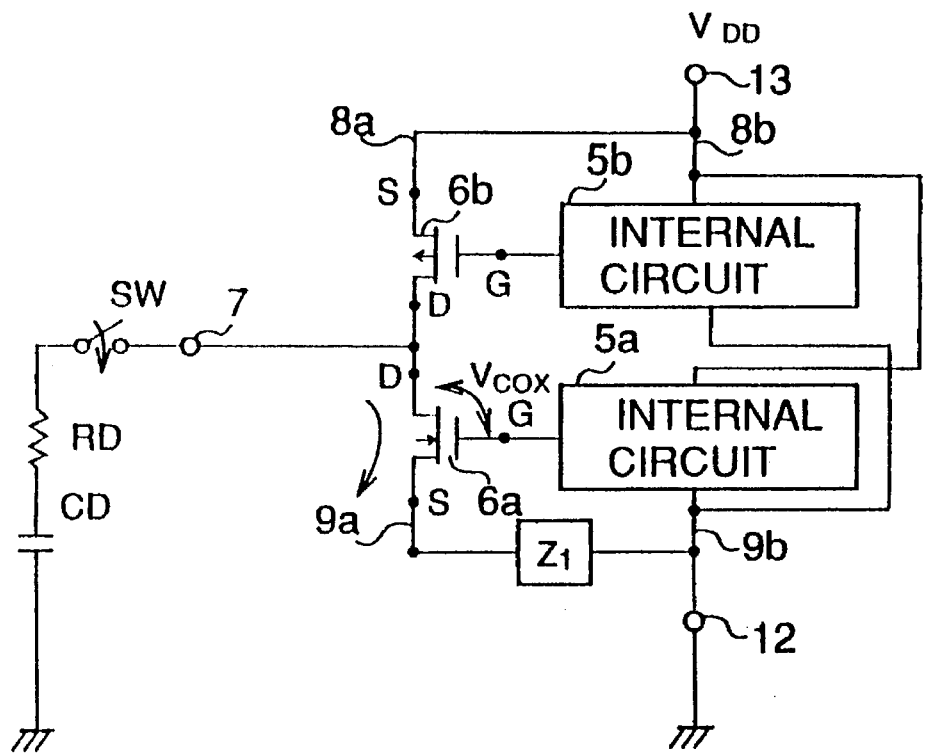
FIG. 2 is a circuit diagram showing an arrangement for testing the effect of static electricity on the output terminal of the conventional circuit shown in FIG. 1.

The internal circuitry 5 includes circuits 5a and 5b connected to a ground terminal 12 by a ground line 9b. The internal circuits 5a, 5b are connected to a power supply terminal 13 by a power supply line 8b. The output circuit 6 includes a first output MISFET 6a connected to the ground terminal 12 by a peripheral ground line 9a, and second output MISFET 6b connected to a power supply terminal 13 by a peripheral power supply line 8a. The output transistors 6a, 6b are controlled by outputs of the internal circuits 5a, 5b through their respective gates. $Z_1$ in FIG. 2 represents an impedance between the peripheral ground line 9a and the ground terminal 12.

The external output terminal 7 is shown connected to a test arrangement which includes, in series, a resistor $R_D$, a capacitor $C_D$ and a switch SW. Application of a surge of static electricity to the terminal 7 is simulated by storing a charge on the capacitor $C_D$ and closing the switch SW. The surge causes an output transistor, for example the output MISFET 6a, to break down. The surge flows into the peripheral ground line 9a through the MISFET 6a. However, since there is an impedance $Z_1$ between the peripheral ground line 9a and the external ground terminal 12, the potential on the source electrode S of the output transistor 6a increases. On the other hand, the gate potential $V_B$ of the MISFET 6a is at ground level, since the gate of the MISFET 6a is connected to the ground line 9b in this situation via the internal circuit 5a. Consequently, a voltage $V_{cox}$ is applied across the gate insulation film between the drain D and the gate G of the output MISFET 6a.

Figure 3:
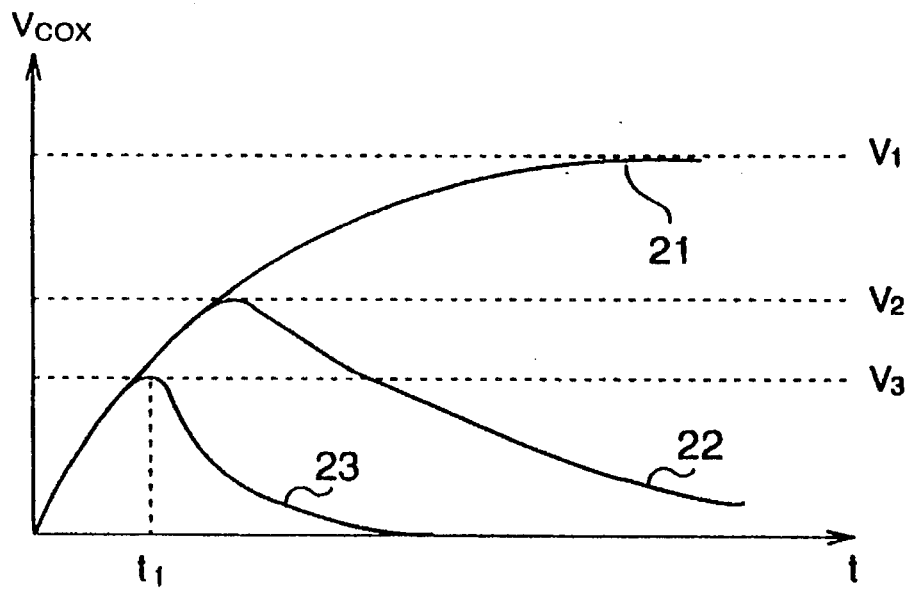
FIG. 3 is a graphical representation of voltage characteristics of the gate insulation film of an output transistor in the semiconductor integrated circuit shown in FIG. 2.

The voltage $V_{cox}$ is shown graphically as a function of time t in FIG. 3, for three cases:

(1) when the impedance Z1 is infinite (line 21);

(2) when the impedance Z1 is zero (line 23); and (3) when the impedance Z1 has an intermediate value (line 22).

Referring to FIG. 3, $V_1$ is a voltage level $C_D \cdot V_A/(C_D+C)$, where $C_D$ is the capacitance of the capacitor $C_D$, C is the total capacitance of the circuit between the external output terminal 7 and the ground terminal 12, and $V_A$ is the voltage externally applied to the capacitor $C_D$. $V_2$ is a minimum voltage level which would damage the gate insulation film if applied between the drain D and the gate G of the output transistor 6a. The voltage $V_3$ is the level of a breakdown voltage $BV_{SD}$ between the drain D and the gate G of the output transistor 6a. Time $t_1$ is the time of breakdown of the output transistor 6a.

As can be seen from FIG. 3, if the impedance $Z_1$ is infinite (line 21), the voltage $V_{cox}$ will approach the maximum value V1 given by the formula $C_D \cdot V_A/(C_D+C)$. This provides maximum protection against ground noise. However, since V1 is greater than the breakdown voltage $BV_{SD}$, for the selected applied voltage $V_A$, damage to the output transistor 6a will result from static electricity at this level.

If the impedance $Z_1$ is zero or small (line 23), the source to drain voltage $V_{cox}$ reaches a maximum voltage value just below the breakdown voltage ($BV_{SD}$), so that damage to the transistor 6a will not occur. This result is dependent on the fact that output the transistor is generally designed so that the minimum voltage for damaging its gate insulation film is higher than $BV_{SD}$. Such a low value of impedance is generally selected only where the risk of malfunction from ground noise is determined to be small.

Sometimes, the impedance Z1 has a large, intermediate value (line 22), as a tradeoff or compromise between protection from malfunctions due to ground noise and damage from static electricity. The present invention reduces the need for such a compromise and eliminates the risk of damage to the output MISFET's from static electricity on the external output terminal.

Figure 4A:
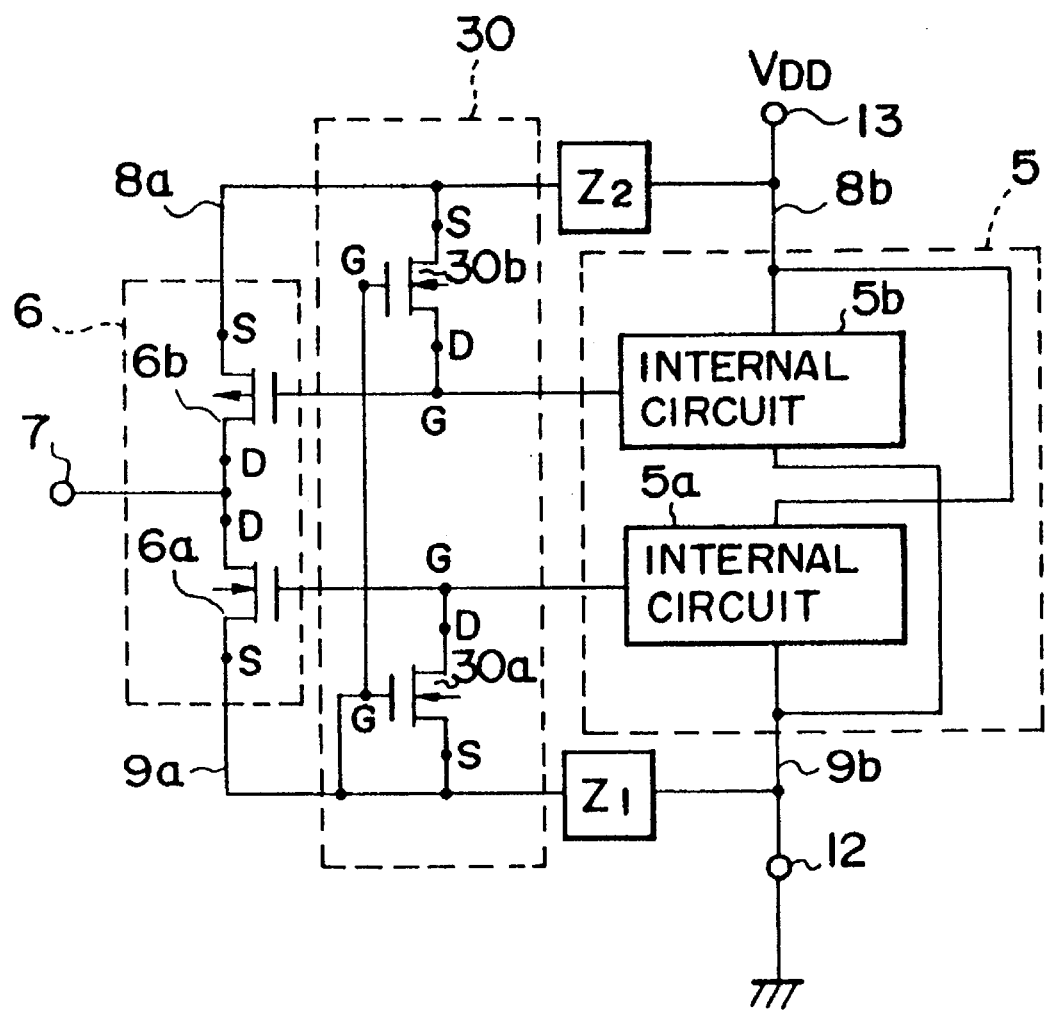
FIG. 4a is a circuit diagram of a semiconductor integrated circuit according to one embodiment of the invention.

Referring now to FIG. 4a, a portion of a semiconductor integrated circuit according to a preferred embodiment of the invention is shown. Reference numerals common to those in FIGS. 1 and 2 designate the same or corresponding elements. The illustrated portion of FIG. 4a may be used in combination the input circuit 1 and protection circuits 10 and 11 shown in FIG. 1.

The semiconductor integrated circuit of FIG. 4a includes a pair of internal circuits 5a, 5b, each constructed with a plurality of MISFET's, which are arranged in a manner known to those skilled in the art. A pair of one n-channel MISFET output transistor 6a and one p-channel MISFET output transistor 6b, connected to form an output stage, have their respective gates connected to output sides of the internal circuits 5a, 5b. The internal circuits 5a, 5b are each connected to a ground terminal 12, through a ground line 9b, and to a power supply terminal 13 for a power supply voltage VDD, through a power supply line 8b. The drain D of the output transistor 6a is connected to an external output terminal 7, and its source S is connected to a ground line 9a for peripheral circuitry. The ground line 9a connects to the ground terminal 12 through an impedance $Z_1$. The drain D of the output transistor 6b connects to the external output terminal 7, and its source S connects to a power supply line 8a for the peripheral circuitry. The power supply line 8a connects to the power supply terminal 13 through an impedance $Z_2$.

The semiconductor integrated circuit is provided with a surge protection circuit 30 which includes a pair of n-channel MISFET's as surge protection transistors 30a, 30b. The protection transistor 30a has its source S connected to the ground line 9a and its drain D connected to the gate G of the output transistor 6a. The protection transistor 30b has its source S connected to the power supply line 8a and its drain D connected to the gate G of the output transistor 6b. The gates G of the protection transistors 30a, 30b are connected to the ground line 9a.

The thus described semiconductor integrated circuit can protect the output transistors 6a, 6b from damage by a positively charged surge current caused by static electricity on the external output terminal 7. If the protection transistors 30a, 30b were not provided as shown in FIG. 4a, the gate insulation film between the drain and the gate of the output transistor 6a could easily be damaged, as could the gate insulation film of the output transistor 6b. However, by providing the protection transistors 30a, 30b, when a surge resulting from static electricity on the output terminal 7 causes the output transistor 6a to break down, the potential of the ground line 9a increases. However, the increased potential of the ground line 9a is applied to the gate G of the protection transistor 30a, thereby activating the transistor 30a. As a result, the gate G of the output transistor 6a has its potential increased as well, through the protection transistor 30a. Consequently, the voltage $V_{cox}$ occurring across the gate insulation film between the drain and the gate of the output transistor 6a is lowered. Furthermore, the increased potential of the ground line 9a is also applied to the gate G of the protection transistor 30b, thereby activating it and increasing the potential on the gate G of output transistor 6b in accordance with the impedance $Z_2$. Therefore, it become possible to increase the externally applied voltage to the terminal 7 without damaging the gate insulation film of either output transistor 6a or output transistor 6b.

Figure 4B:
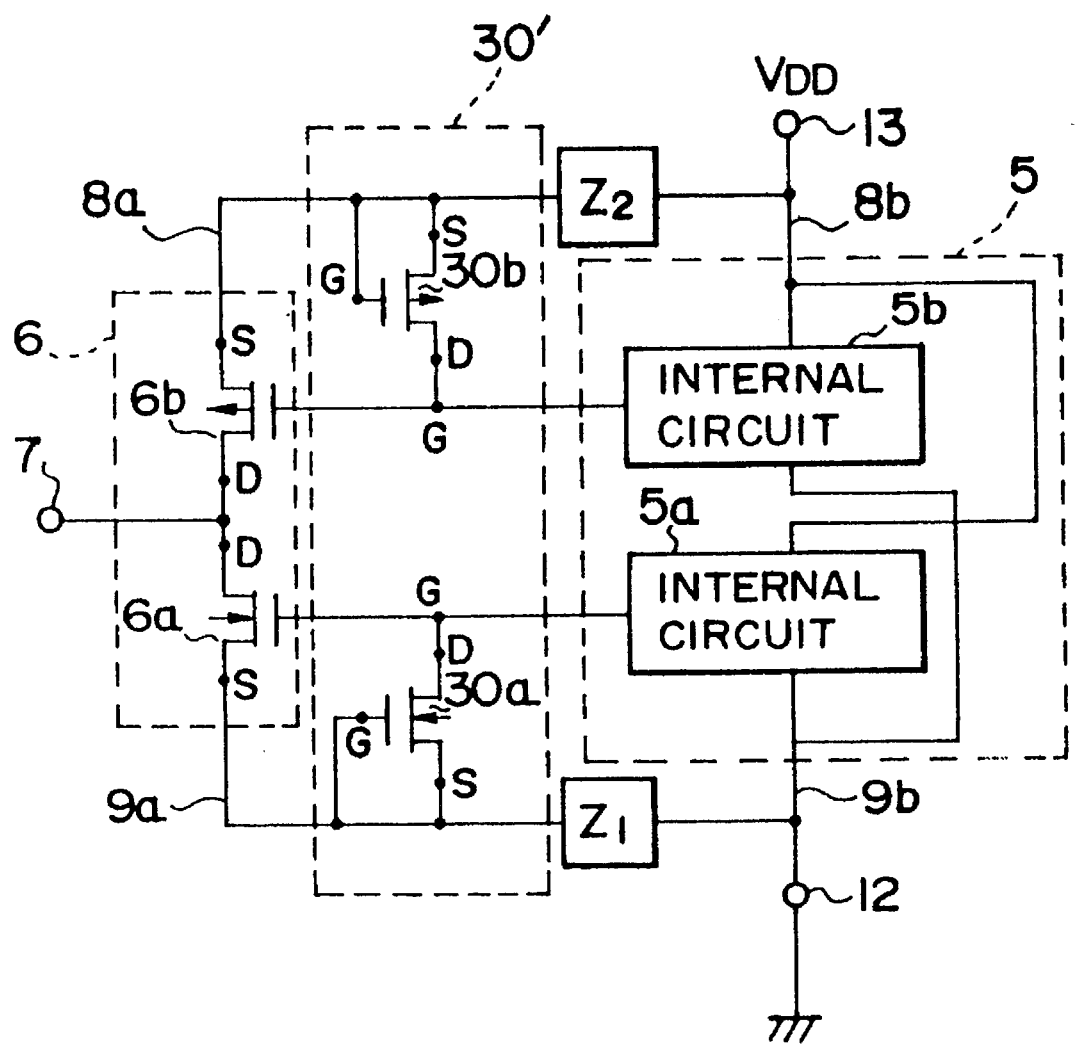
FIG. 4b is a circuit diagram of a semiconductor integrated circuit according to another embodiment of the invention.

The arrangement shown in FIG. 4b is the same as that shown in FIG. 4a except for a modified surge protect ion circuit 30'. Circuit 30', like circuit 30, includes an n-channel protection transistor 30a, whose drain D is connected to the gate G of output transistor 6a and whose gate G and source S are connected to the ground line 9a. Protection transistor 30b, however, is a p-channel MISFET whose gate G is connected to the power supply line 8a rather than ground line 9a. Consequently, protection transistor 30b in circuit 30' is activated when current surges through impedance $Z_2$ following a break-down of output transistor 6b, instead of being activated along with protection transistor 30a by a current surge through impedance $Z_1$ as in circuit 30.

Figure 5:
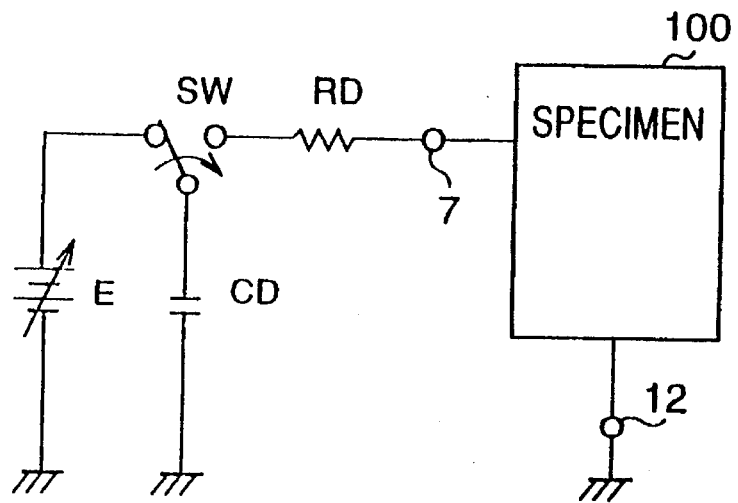

The following TABLE 1 provides a comparison of minimum voltage values on the output terminal 7 necessary to damage the semiconductor integrated circuits when a static electricity damage test was performed on (i) a circuit having protection transistors as shown in FIG. 4a and (ii) a circuit without such a protection transistor as shown in FIG. 2. A MIL standard No. 883C/Method 3015-7 was used, according to the arrangement shown in FIG. 5.

TABLE 1

|  | Specimen without protection transistor | Specimen with protection |
| --- | --- | --- |
| Minimum damage causing voltage | 500 V | 2500 V |

In these tests, a pair of specimens 100 consisting respectively of semiconductor integrated circuit devices as shown in FIGS. 4a and 2, was prepared. The ground terminal 12 of each specimen 100 was connected to the ground potential. The external output terminal 7 was connected to a 1.5 k-ohm discharge resistor $R_D$. The discharge resistor $R_D$ was connected to a 100 pF discharge capacitor $C_D$, and to a direct current power source E, through a switch SW. Each specimen had a gate insulation film thickness of 200Å, a p-type substrate and a LDD transistor structure. After the switch SW was turned to permit the direct current source E to charge the discharge capacitor $C_D$, the switch SW was turned to apply a simulated surge of current to the external output terminal 7 through the discharge resistor $R_D$.

As is shown in TABLE 1, the minimum voltage to cause damage to the output transistor 6a increased five times when the protection transistor 30a was installed in the integrated circuit, thus confirming the effectiveness of the invention. The protection transistor 30b operates equally effectively to protect the output transistor 6b when a surge by static electricity is impressed on the external output terminal 7 while the power supply terminal 13 is at ground potential.

Figure 6:
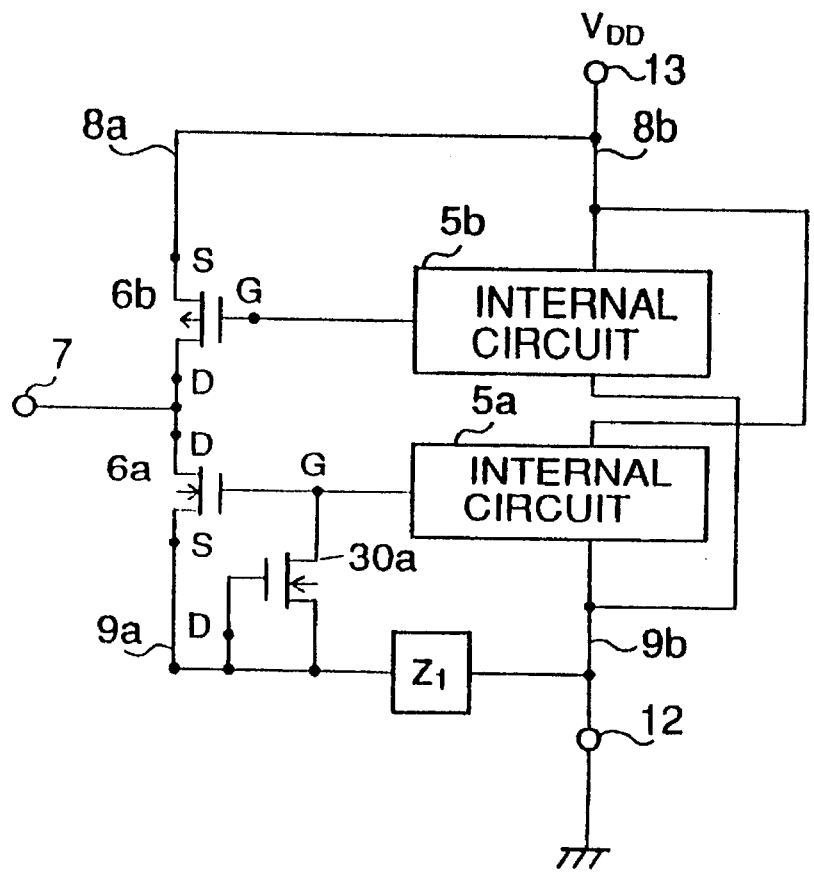
FIGS. 6 to 8 are circuit diagrams of semiconductor integrated circuits according to other embodiments of the invention.

Referring to FIG. 6, another embodiment of the semiconductor integrated circuit according to the invention is shown.

In this semiconductor integrated circuit, the impedance between the power supply line 8a for peripheral circuitry, and the power supply terminal 13, is low, and the impedance $Z_1$, between the ground line 9a for the peripheral circuitry, and the ground terminal 12, is high. A protection transistor 30a therefore is provided only on the side of the output transistor 6a connected to the ground line 9a.

Thus, when a surge by static electricity is impressed on the external output terminal 7, the gate insulation film between the drain and the gate of the output transistor 6b is not damaged, since the impedance between the power supply line 8a and the power supply terminal 13 is low. However, since the impedance $Z_1$ between the ground line 9a and the ground terminal 12 is high, such a static electricity surge causes a high voltage to be applied between the drain D and the gate G of the output transistor 6a. If a breakdown of the output transistor 6a occurs at that time, the potential on the ground line 9a increases as would similarly occur in the semiconductor integrated circuit shown in FIG. 2. However, since the potential of the gate G of the output transistor 6a increases through the protection transistor 30a, the potential difference between the drain D and the gate G of the output transistor 6a is kept small. Consequently damage to the gate insulation film therebetween is avoided.

In addition, when the impedance $Z_1$ between the ground line 9a and the ground terminal 12 is low and the impedance between the power supply line 8a and the power supply terminal 13 is high, the protection transistor 30a is not necessary. The semiconductor integrated circuit then can be formed with a protection transistor 30b in the position shown in FIG. 4b, to protect only the output transistor 6b.

Figure 7:
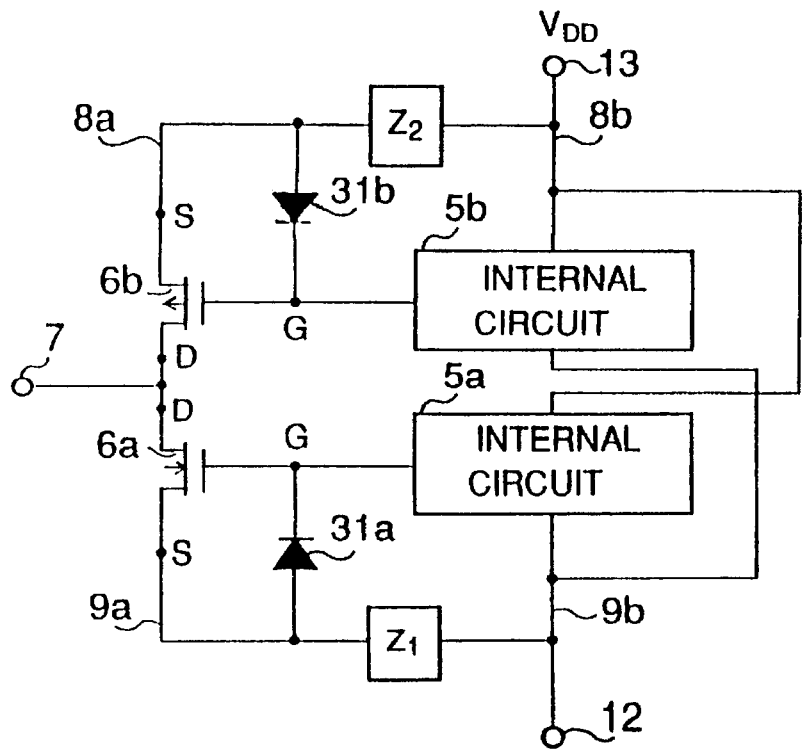

FIG. 7 shows another embodiment of the semiconductor integrated circuit according to the invention. In this semiconductor integrated circuit, a protection circuit which includes a pair of junction diodes 31a, 31b is installed in lieu of the protection transistors 30a, 30b shown in FIGS. 4a and 4b. The anode and the cathode of the junction diode 31a respectively are connected to the source S and the gate G of the output transistor 6a. The anode and the cathode of the junction diode 31b respectively are connected to the source S and the gate G of the output transistor 6b.

When a surge by static electricity is impressed on the external output terminal 7 of the circuit shown in FIG. 7, the potential difference between the drain D and the gate G on each of the output transistors 6a, 6b becomes small, as in the case of the embodiments of FIGS. 4a and 4b described above. Thus, the diodes 31a, 31b similarly prevent damage to the gate insulation film of the output transistors 6a, 6b. Also, with junction diodes 31a, 31b instead of the transistors 30a, 30b, the semiconductor integrated circuit of FIG. 7 has a simpler wiring structure.

Figure 8:
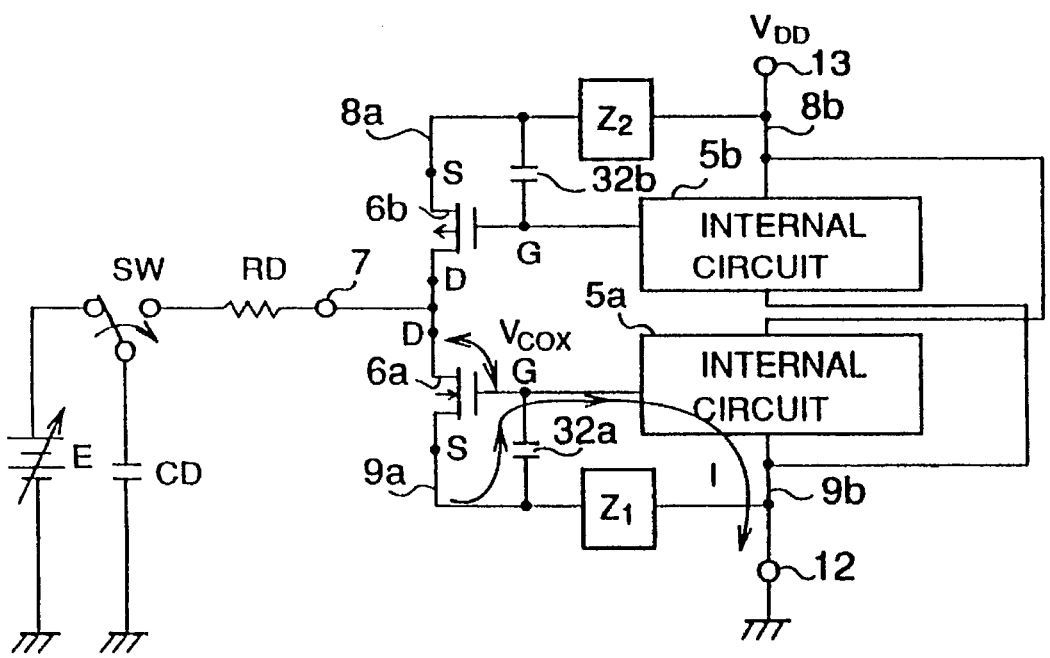

FIG. 8 shows another embodiment of the invention in which a protection circuit which includes a pair of capacitors 32a, 32b is installed in lieu of the protection transistors 30a, 30b shown in FIGS. 4a and 4b. One capacitor 32a is connected between the ground line 9a for peripheral circuitry and the gate G of the output transistor 6a. The other capacitor 32b is connected between the power supply line 8a for peripheral circuitry and the gate G of the output transistor 6b.

When a damage test is performed using the arrangement shown in FIG. 8, an electric charge is first stored on the discharge capacitor $C_D$, using the direct current source E. To simulate a surge of static electricity to the external output terminal 7, the capacitor $C_D$ is discharged through the discharge resistor $R_D$ by controlling the switch SW. The simulated surge breaks down the output transistor 6a so that the potential on the ground line 9a increases. When the potential of the ground line 9a increases, a current l flows from the ground line 9a to the ground terminal 12 through the capacitor 32a and the internal circuit 5a. This current flow decreases the potential on the source S and drain D of the output transistor 6a. Accordingly, the maximum value of the voltage $V_{cox}$, applied to the gate insulation film between the drain D and gate G of the output transistor 6a, is reduced, so that damage to the gate insulation film is avoided.

It is to be noted that although the semiconductor integrated circuit according to the invention is described above with reference to preferred embodiments, other variations may be possible. For example, although the junction diodes 31a, 31b and the capacitors 32a, 32b are provided for both output transistors 6a, 6b, as shown respectively in FIGS. 7 and 8, if a high impedance is required on only one side of the output transistors, then a protection circuit which includes only one diode or capacitor need be provided. Similarly to the embodiment of FIG. 6, in which only one protection transistor 30a is provided, a capacitor or diode can be provided only on the side of the output transistors at which the impedance is high, without any loss in effectiveness of the protection circuit.

It is understood that although the invention has been described in detail with respect to preferred embodiments thereof, the invention is not limited thereto. Other embodiments and variations which fall within the scope and spirit of the invention will be apparent to those skilled in the art, the invention being limited only by the following claims.

What is claimed is:

1. A semiconductor integrated circuit, comprising:

an external output terminal;

an input circuit, said input circuit having an input terminal for receiving an input signal;

an internal circuit for providing an internal signal, said internal circuit being connected to said input circuit;

a first power supply line and a first ground line, connected for activating said internal circuit;

an output MISFET circuit, responsive to the internal signal from said internal circuit, for outputting an output signal to said external output terminal;

a second power supply line and a second ground line, connected for activating said output MISFET circuit;

an impedance circuit, electrically connecting at least said second power supply line to said first power supply line or said second ground line to said first ground line; and a surge protection circuit, located between a gate circuit of said output MISFET circuit, and at least said second power supply line or said second ground line, and responsive to a breakdown of said output MISFET circuit, for reducing a voltage difference between said gate circuit and either or both of said second power supply line and said second ground line, thereby to protect said output MISFET circuit from damage by a surge of static electricity on said external output terminal.

2. A semiconductor integrated circuit according to claim 1, wherein said impedance circuit connects only said first and second ground lines, said surge protection circuit connecting said gate circuit only to said second ground line.

3. A semiconductor integrated circuit according to claim 1, wherein said impedance circuit connects said first and second power supply lines, said surge protection circuit connecting said gate circuit to said second power supply line.

4. A semiconductor integrated circuit according to claim 1, wherein said surge protection circuit comprises at least one diode.

5. A semiconductor integrated circuit according to claim 1, wherein said surge protection circuit comprises at least one capacitor.

6. A semiconductor integrated circuit according to claim 1, wherein said impedance circuit comprises a first impedance connecting said first ground line to said second ground line and a second impedance connecting said first power supply line to said second power supply line, said surge protection circuit comprising a first surge protection circuit for reducing a voltage difference between said gate circuit and said second ground line, and a second surge protection circuit for reducing a voltage difference between said gate circuit and said second power supply line.

7. A semiconductor integrated circuit according to claim 6, wherein said first surge protection circuit comprises a first diode circuit connecting said gate circuit to said second ground line, and said second surge protection circuit comprises a second diode circuit connecting said gate circuit to said second power supply line.

8. A semiconductor integrated circuit according to claim 7, wherein said internal circuit comprises first and second internal circuits, each actuated by said first power supply line and said first ground line, each of said first and second internal circuits having a respective output side, said output MISFET circuit comprising a first output MISFET connected between said output terminal and said second ground line, and a second output MISFET connected between said output terminal and said second power supply line, said first and second output MISFET's having respective first and second gates, said first gate being connected to the output side of said first internal circuit, said second gate being connected to the output side of said second internal circuit, said first diode circuit being connected between said first gate and said second ground line, and said second diode circuit being connected between said second gate and said second power supply line.

9. A semiconductor integrated circuit according to claim 6, wherein said first surge protection circuit comprises a first capacitor circuit connecting said gate circuit to said second ground line, and said second surge protection circuit comprises a second capacitor circuit connecting said gate circuit to said second power supply line.

10. A semiconductor integrated circuit according to claim 9, wherein said internal circuit comprises first and second internal circuits, each actuated by said first power supply line and said first ground line, each of said first and second internal circuits having a respective output side, said output MISFET circuit comprising a first output MISFET connected between said output terminal and said second ground line, and a second output MISFET connected between said output terminal and said second power supply line, said first and second output MISFET's having respective first and second gates, said first gate being connected to the output side of said first internal circuit, said second gate being connected to the output side of said second internal circuit, said first capacitor circuit being connected between said first gate and said second ground line, and said second capacitor circuit being connected between said second gate and said second power supply line.

11. A semiconductor integrated circuit according to claim 6, wherein said first surge protection circuit comprises a first protection MISFET, said first protection MISFET connecting said gate circuit to said second ground line, said second surge protection circuit comprising a second protection MISFET said second protection MISFET connecting said gate circuit to said second power supply line.

12. A semiconductor integrated circuit according to claim 11, wherein said internal circuit comprises first and second internal circuits, each actuated by said first power supply line and said first ground line, each of said first and second internal circuits having a respective output side, said output MISFET circuit comprising a first output MISFET connected between said output terminal and said second ground line, and a second output MISFET connected between said output terminal and said second power supply line, said first and second output MISFET's having respective first and second gates, said first gate being connected to the output side of said first internal circuit, said second gate being connected to the output side of said second internal circuit, said first protection MISFET being connected between said first gate and said second ground line, and said second protection MISFET being connected between said second gate and said second power supply line.

13. A semiconductor integrated circuit according to claim 1, wherein said input circuit includes MISFET's and has an input side connected to said input terminal and an output side connected to an input side of said internal circuit, and further comprising a third power supply line and a third ground line, for activating said input circuit; and an input circuit protection circuit, including a plurality of MISFET's, for protecting said input circuit from an electrical power surge impressed on said external input terminal or said external output terminal.

14. A semiconductor integrated circuit according to claim 1, wherein said impedance circuit comprises an impedance connecting said first ground line to said second ground line, said surge protection circuit comprising a MISFET and being connected only between said gate circuit and said second ground line, for reducing a voltage difference between said gate circuit and said second ground line.

15. A semiconductor integrated circuit according to claim 14, wherein said internal circuit comprises first and second internal circuits, each actuated by said first power supply line and said first ground line, each of said first and second internal circuits having a respective output side, said MISFET circuit comprising a first MISFET connected between said output terminal and said second ground line, and a second MISFET connected between said output terminal and said second power supply line, said first and second MISFET's having respective first and second gates, said first gate being connected to the output side of said first internal circuit, said second gate being connected to the output side of said second internal circuit, and the MISFET of said surge protection circuit being connected between said first gate and said second ground line.

16. A semiconductor integrated circuit according to claim 1, wherein said output MISFET circuit comprises MISFET's having lightly doped drain structures.

17. A semiconductor integrated circuit according to claim 1, wherein said output MISFET circuit comprises an n-channel MISFET and said surge protection circuit comprises at least one n-channel MISFET.

18. A semiconductor integrated circuit according to claim 1, wherein said output MISFET circuit comprises a p-channel MISFET and said surge protection circuit comprises at least one p-channel MISFET.

19. A semiconductor integrated circuit, comprising:

an external output terminal;

an input circuit, said input circuit having an input terminal for receiving an input signal;

an internal circuit for providing an internal signal, said internal circuit being connected to said input circuit;

a first power supply line and a first ground line, connected for activating said internal circuit;

an output MISFET circuit, responsive to the internal signal from said internal circuit, for outputting an output signal to said external output terminal;

a second power supply line and a second ground line, connected for activating said output MISFET circuit;

a first connecting circuit having high impedance and a second connecting circuit having low impedance, one of the first and second connecting circuits having a first side connected to said first ground line and a second side connected to said second ground line so as to electrically connect said second ground line to said first ground line, and the other of said first and second connecting circuits having a first side connected to said first power supply line and a second side connected to said second power supply line so as to electrically connect said second power supply line to said first power supply line; and a surge protection circuit, located between a gate circuit of said output MISFET circuit, and the second side of said first connecting circuit, and responsive to a breakdown of said output MISFET circuit, for reducing a voltage difference between said gate circuit and said second side of said first connecting circuit, thereby to protect said output MISFET circuit from damage by a surge of static electricity on said external output terminal.

20. A semiconductor integrated circuit according to claim 19, wherein said first connecting circuit connects said first and second ground lines, said surge protection circuit connecting said gate circuit only to said second ground line.

21. A semiconductor integrated circuit according to claim 19, wherein said surge protection circuit connects said gate circuit to the second side of only said first connecting circuit.

22. A semiconductor integrated circuit according to claim 19, wherein said surge protection circuit comprises a MISFET.

23. A semiconductor integrated circuit according to claim 22, wherein said internal circuit comprises first and second internal circuits, each actuated by said first power supply line and said first ground line, each of said first and second internal circuits having a respective output side, said MISFET circuit comprising a first MISFET connected between said output terminal and said second ground line, and a second MISFET connected between said output terminal and said second power supply line, said first and second MISFET's having respective first and second gates, said first gate being connected to the output side of said first internal circuit, said second gate being connected to the output side of said second internal circuit, and the MISFET of said surge protection circuit being connected between said first gate and said second ground line.

24. A semiconductor integrated circuit according to claim 19, wherein said surge protection circuit comprises a capacitor.

25. A semiconductor integrated circuit according to claim 19, wherein said surge protection circuit comprises a diode.

26. A semiconductor integrated circuit for use with a power supply which provides first and second potentials, the second potential being lower than the first potential, comprising:

an input circuit having an input terminal for receiving an input signal;

first, second, and third nodes, the first node receiving the first potential and the second node receiving the second potential;

an internal circuit for providing an internal signal;

an output terminal coupled to the third node;

a first transistor having a first gate electrode to which the internal signal from said internal signal is applied, coupled between the first and third nodes;

a second transistor having a second gate electrode to which the internal signal from said internal circuit is applied, coupled between the second and third nodes; and a first protection circuit coupled between the second gate electrode and the second node, for defining a potential of the second gate electrode in response to the potential of the second node.

27. The semiconductor integrated circuit according to claim 26, further comprising a second protection circuit coupled between the first gate electrode and the first node, for defining a potential of the first gate electrode in response to the potential of the first node.

28. A semiconductor integrated circuit, comprising:

an external output terminal;

an input circuit having an input terminal and an output;

an internal circuit having an input and an output, the input of the internal circuit being connected to the output of the input circuit, the internal circuit providing an internal signal at its output;

first and second lines, one of said first and second lines being a power supply line, the other being a ground line, said first and second lines being connected for activating said internal circuit;

output circuit means, responsive to the internal signal, for outputting an output signal to said external output terminal, said output circuit means including a MISFET having a gate;

means for connecting said output circuit means to each of said first and second lines, so as to provide power for activating said output circuit means, said connecting means including an impedance having a first side connected to said first line a second side connected to said output circuit means;

a surge protection circuit including surge protection means, connected between said gate and said second side of said impedance, and responsive to a breakdown of said MISFET, for reducing a voltage difference between said gate and said second side of said impedance, thereby to protect said output circuit means from damage by a surge of static electricity on said external output terminal.

29. A semiconductor integrated circuit according to claim 28, wherein said impedance is a first impedance and said surge protection means is a first surge protection means, said output circuit means further comprising another MISFET having a gate, said means for connecting further comprising a second impedance having a first side connected to the second line and a second side connected to said output circuit means, and said surge protection circuit further comprising a second surge protection means, connected between said gate of said another MISFET and said second side of said second impedance, and response to a breakdown of said output circuit means, for reducing a voltage difference between said gate of said another MISFET and said second side of said second impedance, thereby to further protect said output circuit means from damage by a surge of static electricity on said external output terminal.

30. A semiconductor integrated circuit according to claim 28, wherein said impedance is a first impedance having a first impedance value, said means for connecting further comprising a second impedance having a first side connected to the second line and a second side connected to said output circuit means, said second impedance having a second impedance value lower than the first impedance value, said surge protection circuit connecting said gate to the second side of only said first impedance.

* * * * *